US005143641A

United States Patent [19]

Nunn

[11] Patent Number: 5,143,641

[45] Date of Patent: Sep. 1, 1992

[54] ESTER PERHYDROLYSIS BY PRECONCENTRATION OF INGREDIENTS

[75] Inventor: Charles C. Nunn, Rutherford, N.J.

[73] Assignee: Lever Brothers Company, Division of Conopco, Inc., New York, N.Y.

[21] Appl. No.: 582,281

[22] Filed: Sep. 14, 1990

[51] Int. Cl.[5] .......... C09K 3/00

[52] U.S. Cl. .......... 252/186.38; 252/186.39

[58] Field of Search .......... 252/186.38, 186.39

[56] References Cited

U.S. PATENT DOCUMENTS

| | | | |
|---|---|---|---|
| 3,256,198 | 6/1966 | Matzner | 252/99 |
| 3,272,750 | 9/1966 | Chase | 252/99 |
| 4,367,156 | 1/1983 | Dieh | 252/186.38 |
| 4,412,934 | 11/1983 | Chung et al. | 252/186.38 |
| 4,486,327 | 12/1984 | Murphy et al. | 252/186.38 |
| 4,536,314 | 8/1985 | Hardy et al. | 252/186.38 |
| 4,751,015 | 6/1988 | Humphreys et al. | 252/186.38 |
| 4,818,426 | 4/1989 | Humphreys et al. | 252/186.38 |

FOREIGN PATENT DOCUMENTS

| | | | |
|---|---|---|---|
| 2175621 | 12/1986 | United Kingdom | 252/186.38 |

*Primary Examiner*—Richard D. Lovering
*Assistant Examiner*—Joseph D. Anthony
*Attorney, Agent, or Firm*—Milton L. Honig

[57] ABSTRACT

A bleaching composition in concentrated form is provided that includes a peroxygen compound and an organic bleach precursor. The precursor is selected from esters and carbonates having a leaving group whose conjugate acid has a pKa of greater than 13. Particularly preferred are quaternary ammonium functionalized compounds. Absent preconcentration of the components, poor bleaching would result. Concentrated compositions may be achieved through use of encapsulation or by way of a sachet.

18 Claims, No Drawings

ESTER PERHYDROLYSIS BY PRECONCENTRATION OF INGREDIENTS

BACKGROUND OF THE INVENTION

1. Field of the Invention

The invention relates to a method and composition for bleaching which may be incorporated into detergent formulations.

2. The Related Art

Under relatively mild temperature conditions, inorganic peroxides such as perborates and percarbonates are relatively ineffective at removing stains from substrates. This is especially a problem in the cleaning of fabrics.

A good effect can however be achieved with the aid of an organic bleach precursor or activator. Stain removal can be achieved at temperatures considerably below 60° C. with such combination of chemicals. The mechanism involves reaction of the organic precursor with perhydroxyl anion generated from the inorganic peroxide. Perhydrolysis of the precursor then affords the active species which is an organic peroxo anion.

Typically, precursors are reactive esters of organic carboxylic or carbonic acids. In order to react with the inorganic peroxide (i.e. the perhydroxyl anion) to form the organic peroxo anion peracid, the ester must contain a good leaving group. Most often this leaving group is a phenol sulfonate.

Illustrative of this art is U.S. Pat. No. 4,412,934 (Chung et al). Therein is reported combinations of peroxygen bleaching compounds with the general formula RCOL. Leaving group (L) is required to have a conjugate acid of $pK_a$ in a range from 6 to about 13. Sodium nonanoyloxybenzene sulfonate (SNOBS) is noted to be particularly effective. This precursor is today part of a fabric detergent product in wide commercial use.

Illustrative of carbonate ester precursors are the disclosure of U.S. Pat. No. 4,751,015 and U.S. Pat. No. 4,818,426 each to Humphreys et al. Therein is reported a series of quaternary ammonium type precursors. Of particular efficacy is 2-(N,N,N-trimethylammonium) ethyl 4-sulfophenyl carbonate (CSPC).

A common characteristic of SNOBS and CSPC as well as other known precursors is inclusion in their structure of phenol sulfonate as the leaving group. Synthesis of phenol sulfonates is expensive. Hydrogen chloride is often a by-product. Corrosion resistant equipment is therefore necessary. Hydrogen chloride generation also demands extensive pollution control systems.

Accordingly, it is an object of the present invention to provide a precursor for use in bleaching compositions which can be economically synthesized.

Another object of the present invention is to provide a method for cleaning fabrics and other stained substrates utilizing a low cost precursor.

These and other objects of the present invention will become more readily apparent through consideration of the following detailed description and Examples.

SUMMARY OF THE INVENTION

A bleaching composition is provided comprising:

(i) a peroxygen compound capable of generating perhydroxyl anion in an aqueous solution; and (ii) an organic bleach precursor selected from esters and carbonates having a leaving group whose conjugate acid has a pKa of greater than 13; the peroxygen compound and precursor being present in a relative molar ratio of greater than about 1:1.

Among the precursors most preferred are quaternary ammonium substituted esters having the structure:

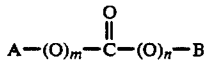

wherein:

A is 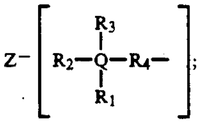;

$R_1$, $R_2$ and $R_3$ are each a radical selected from the group consisting of alkyl, alkenyl, alkynyl, cycloalkyl, cycloalkenyl, alkaryl, aryl, phenyl, hydroxyalkyl, polyoxyalkylene, and $R_4(O)_mC(O)_nR_1$;

or two or more of $R_1$, $R_2$ and $R_3$ together form an alkyl substituted or unsubstituted nitrogen-containing heterocyclic ring system;

or at least one of $R_1$, $R_2$ and $R_3$ is attached to $R_4$ to form an alkyl substituted or unsubstituted nitrogen-containing heterocyclic ring system;

$R_4$ is selected from a bridging group consisting of alkylene, cycloalkylene, alkylenephenylene, phenylene, arylene, and polyalkoxylene, and wherein the bridging group can be unsubstituted or substituted with $C_1$–$C_{20}$ atoms selected from alkyl, alkenyl, benzyl, phenyl and aryl radicals;

$Z^-$ is a monovalent or multivalent anion leading to charge neutrality when combined with $Q+$ in the appropriate ratio and wherein $Z^-$ is sufficiently oxidatively stable not to interfere significantly with bleaching by a perhydroxyl anion;

Q is nitrogen or phosphorous;

m and n are integers independently selected from 0 and 1, the sum of m and n being at least 1; and B is A or $R_1$.

DETAILED DESCRIPTION

A program directed at the above objectives has led to discovery of a delivery system which concentrates an active oxygen source to initiate perhydrolysis of otherwise inexpensive but also inefficient bleach precursors. Ester Perhydrolysis by Preconcentration of Ingredients (EPPI) has been found to accomplish the aforementioned objectives.

Although not wishing to be bound by any theory, the following considerations may be helpful in an understanding of this invention. Under ordinary fabric wash conditions, the concentration of active nucleophile, $OOH^-$, is very small. Concentration of hydrogen peroxide is normally about $1\times10^{-3}$ M (15 ppm AOX hydrogen peroxide). Given a value of about 11.7 for the $pK_a$ of hydrogen peroxide, at a wash pH of 9.5, the $OOH^-$ concentration would be about a hundredth that of hydrogen peroxide, or around $10^{-5}$ M. In fact, the $OH^-$ concentration under these conditions of about $3\times10^{-5}$ is actually higher than the $OOH^-$ concentration; perhydrolysis however is favored over hydrolysis because the $OOH^-$ is a much better nucleophile than $OH^-$. Precursors that are relatively unstable esters are required because of the low $OOH^-$ concentration available in the wash. Unfortunately, it is precisely these unstable esters which are expensive to synthesize.

If however the concentration of hydrogen peroxide could be significantly increased over $10^{-5}$ M, perhaps by several orders of magnitude, then somewhat less reactive esters might be driven in the perhydrolysis reaction direction.

The EPPI concept has herein been embodied by the use of specially designed sachets or through encapsulates. These delivery systems initially swell with water allowing reaction to proceed at very high reactant concentrations prior to releasing the products thereof into the wash liquor. Each of these delivery systems involve effecting the perhydrolysis in a preconcentrate of detergent ingredients. Advantageously, the preconcentrate composition will consist of a peroxygen compound and a precursor at a combined level of at least 80% of the preconcentrate, preferably at least 90% but optimally about 100% by weight.

When applied to the bleaching of fabrics in a washing machine, the preconcentrate is preferably wetted with a small amount of water prior to allowing its full entry in the main wash water of the machine. The preconcentrate composition is preferably wetted initially with water in a respective amount of from 10:1 to 1:10 by weight. Optimal results may be obtained with a weight ratio of composition to water ranging from 1:3 to 1:2.

There is a general relationship between acidity of leaving groups attached to carboxylic and carbonic acid esters and reactivity of these esters toward perhydrolysis. Thus, leaving groups such as phenol and sulfophenol having values less than about 11 perhydrolyze readily. Aliphatic alcohols, with $pK_a$ values of 15 to 17 give rise to esters which are not perhydrolyzed at all under wash conditions. According to the present invention, suitable esters are only those which bear leaving groups the conjugate acid of which has a $pK_a$ in the range from about 13 to 15, preferably from 13.5 to 15.

A particularly suitable type of carboxylic and carbonic acid ester is one containing quaternary ammonium groups having the general structure:

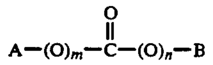

wherein:

A is 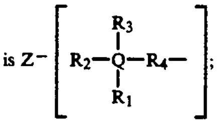;

$R_1$, $R_2$ and $R_3$ are each a radical selected from the group consisting of alkyl, alkenyl, alkynyl, cycloalkyl, cycloalkenyl, alkaryl, aryl, phenyl, hydroxyalkyl, polyoxyalkylene, and $R_4(O)_mC(O)_nR_1$;

or two or more of $R_1$, $R_2$ and $R_3$ together form an alkyl substituted or unsubstituted nitrogen-containing heterocyclic ring system;

or at least one of $R_1$, $R_2$ and $R_3$ is attached to $R_4$ to form an alkyl substituted or unsubstituted nitrogen-containing heterocyclic ring system;

$R_4$ is selected from a bridging group consisting of alkylene, cycloalkylene, alkylenephenylene, phenylene, arylene, and polyalkoxylene, and wherein the bridging group can be unsubstituted or substituted with $C_1$–$C_{20}$ atoms selected from alkyl, alkenyl, benzyl, phenyl and aryl radicals;

$Z^-$ is a monovalent or multivalent anion leading to charge neutrality when combined with $Q^+$ in the appropriate ratio and wherein $Z^-$ is sufficiently oxidatively stable not to interfere significantly with bleaching by a perhydroxyl anion;

Q is nitrogen or phosphorous;

m and n are integers independently selected from 0 and 1, the sum of m and n being at least 1; and B is A or $R_1$.

In particular, it is desirable that $R_1$ be a short-chain $C_1$–$C_4$ alkyl radical, preferably methyl, while $R_2$ and $R_3$ may be a longer chain $C_7$–$C_{20}$ alkyl or alkylaryl, such as stearyl, lauryl, or benzyl group. With regard to the $R_4$ bridge between the quaternary nitrogen and carbonate groups, it is desirable that $R_4$ be a bridging group selected from $C_2$–$C_{20}$ alkylene, $C_6$–$C_{12}$ phenylene, $C_5$–$C_{20}$ cycloalkylene, and $C_8$–$C_{20}$ alkylenephenylene groups. Preferably, the alkylene groups should have 2 carbon atoms. Further, the bridging group can be unsubstituted or substituted with $C_1$–$C_{20}$ alkyl, alkenyl, benzyl, phenyl and aryl radicals.

Within the context of this invention, there may be compounds wherein $R_1$ and $R_4$ together or $R_1$ and $R_2$ together form an alkyl substituted or unsubstituted nitrogen-containing heterocyclic ring system. Representative of these systems are rings defining pyridine, morpholine, pyrrole, imidazole, triazole, tetrazole, pyrrolidine, piperidine and piperazine.

The following compounds are illustrative of precursors within the present invention.

Bis [2-(N-benzyl-N,N-dimethylammonium)ethyl] carbonate chloride

Bis [2-(N,N,N-trimethylammonium)ethyl] carbonate chloride

Bis [2-(N,N-ditallow-N-methylammonium)ethyl] carbonate chloride

Bis [3-(N-nonyl-N,N-dimethylammonium)propyl] carbonate chloride

Bis [2-(N-benzyl-N,N-diethylammonium)ethyl] carbonate methosulfate

Bis [2-N-benzyl,N-dimethylammonium)ethyl] carbonate bromide

Bis [2-(N-butyl-N,N-dimethylammonium)ethyl] carbonate bromide

Bis [2-(N-stearyl-N,N-diethylammonium)ethyl] carbonate chloride

Bis [2-(N-diethylhexyl-N-N-dimethylammonium)ethyl] carbonate chloride

Bis [2-(N,N,N-triethylammonium)ethyl carbonate methosulfate

Bis [4-(N,N,N-trimethylammonium)butyl] carbonate bromide

Bis [2-(N,N,N-tributylammonium)ethyl] carbonate chloride

Bis [2-(N,N,N-tribenzylammonium)ethyl] carbonate methosulfate

Bis [1-(N,N-dihexyl-N-methylammonium)-3-phenyl-2-propyl] carbonate chloride

Bis [2-(N,N,N-tributylammonium)-3-(4-hexylphenyl)-1-propyl carbonate chloride

Bis [6-(N,N,N-triethylammonium)methyl]-6-dodecyl] carbonate chloride

Bis [2-(N,N-didodecyl-N-ethylammonium)propyl] carbonate chloride

Bis [2-(N-benzyl-N-(2-hydroxyethyl)-N-dodecylammonium]ethyl] carbonate chloride

Bis [2-(N-decyl-N,N-diethylammonium)ethyl] carbonate chloride

Bis [4-(N-phenyl-N,N-didodecylammonium)butyl] carbonate chloride

Bis [5-(N-dodecyl-N,N-dimethylammonium)-6-dodecyl] carbonate chloride

Bis [2-[2-dodecyl-4(N,N,N-triethylammonium)phenyl-]ethyl] carbonate chloride

Sodium N-[2-(4-ethoxycarbonyloxy)ethyl]-4-decylpyridinium chloride

Sodium N-[2-(4-ethoxycarbonyloxy)ethyl]methyldodecyl ammonium chloride

Disodium bis[(4-ethoxycarbonyloxy)ethyl]methyldodecyl ammonium chloride

Trisodium tris[(4-ethoxycarbonyloxy)ethyl]dodecyl ammonium chloride

Bis [2-(N,N,N-trimethylammonium)tetradecyl] carbonate chloride

Bis [2-(N-octyl-N,N-dimethylammonium)ethyl] carbonate chloride

Bis [2-(N,N-didecyl-N-methylammonium)ethyl] carbonate chloride

Bis [2-(N-benzyl-N-dodecyl-N-methylammonium-)ethyl] carbonate chloride

Bis [2-(N,N,N-trioctylammonium)ethyl] carbonate chloride

Bis [1-(N,N,N-trimethylammonium)-2-dodecyl] carbonate chloride

Bis [1-(N-benzyl-N,N-dibutylammonium)-2-octyl]carbonate chloride

Bis [2-(N,N,N-trihexylammonium)-1-phenylethyl]carbonate chloride

Bis [12-(N,N,N-triethylammonium)dodecyl] carbonate dichloride

Bis [2-(N-hexyl-N,N-dimethylammonium)ethyl] carbonate methosulfate

Most preferred among this category is Bis [2-(N,N,N-tri-methylammonium)ethyl] carbonate salts hereinafter referred to as DCC.

Another essential component of compositions within this invention is a peroxygen source generating perhydroxyl anion in aqueous solution.

Peroxide sources are well-known in the art. They include the alkaline metal peroxides, organic peroxides such urea peroxide, and inorganic persalts, such as the alkalimetal perborates, perphosphates, persilicates and persulphates. Mixtures of two or more such compounds may also be suitable. Particularly preferred is sodium percarbonate. Not only has this persalt been shown as especially effective within the context of this invention but it is also rapidly dissolving in aqueous solutions and has minimal environmental impact.

Typically, the molar ratio of peroxygen compound to precursor will range from about 30:1 to more than about 1:1, preferably from about 20:1 to 2:1, optimally from about 10:1 to about 8:1.

A detergent formulation containing a bleach system as hereinabove described will usually also contain surface active materials, detergency builders and other known ingredients of such formulations. The surface-active material may be naturally derived, such as soap, or a synthetic material selected from anionic, nonionic, amphoteric, zwitterionic, cationic actives and mixtures thereof. Many suitable actives are commercially available and are fully described in the literature; see for example "Surface Active Agents and Detergents", Volumes I and II, by Schwartz, Perry and Berch. The total level of the surface-active material may range up to 50% by weight, preferably being about 1% to 40% by weight of the composition, optimally 4% to 25%.

The detergent compositions of the invention will normally also contain a detergency builder. Builder materials may be selected from (1) calcium sequestrant materials, (2) precipitating materials, (3) calcium ion-exchange materials and (4) mixtures thereof.

In particular, the compositions of the invention may contain any one of the organic or inorganic builder materials, such as sodium or potassium tripolyphosphate, sodium or potassium pyrophosphate, sodium or potassium orthophosphate, sodium carbonate, crystalline or amorphous aluminosilicates, the sodium salt of nitrilotriacetic acid, sodium citrate, carboxymethylmalonate, carboxymethyloxysuccinate, oxydisuccinates or mixtures thereof.

These builder materials may be present at a level of, for example, from 5 to 80% by weight, preferably from 10 to 60% by weight.

When the peroxygen compound and bleach precursor are dispersed in water, a peroxo anion of the precursor will be generated which should deliver from about 0.1 to about 100 ppm active oxygen per liter of water; preferably oxygen delivery should range from 2 to 50 ppm. Surfactant should be present in the wash water from about 0.05 to 2.0 grams per liter, preferably from 0.15 to 1.0 grams per liter. When present, the builder amount will range from about 0.1 to 5.0 grams per liter.

Apart from the components already mentioned, the detergent compositions of the invention can contain any of the conventional additives in the amounts in which such materials are normally employed in fabric washing detergent compositions. Examples of these additives include lather boosters such as alkanolamides, particularly the monoethanolamides derived from palmkernel fatty acids and coconut fatty acids, lather depressants such as alkyl phosphates and silicones, anti-redeposition agents such as sodium carboxymethylcellulose and alkyl or substituted alkylcellulose ethers, other stabilizers such as ethylenediaminetetraacetic acid, fabric softening agents, inorganic salts such as sodium sulphate, and, usually present in very small amounts, fluorescent agents, perfumes, enzymes such as proteases, cellulases, lipases and amylases, germicides and colorants.

A further important aspect of the present invention is a delivery vehicle capable of preconcentrating the peroxygen and precursor ingredients. Sachets are particularly suited for delivery of EPPI systems. Sachets are normally rectangular or square pouches having a seal capable of opening on at least one side thereof. Although the invention may utilize a single compartment, multicompartment sachets are especially effective within the context of this invention.

The sachet walls may be in any form although flexible materials such as webs or sheets or woven, knitted or non-woven fabric or paper are preferred. The wall material is preferably fibrous but may also be filamentary, slitted or foraminous. Suitable fibrous materials include cellulose, cellulose/regenerated cellulose mixtures, polyesters, polyolefins and mixtures thereof. More specifically, walls may be comprised of a sausage casing paper or a viscose/cellulose mix.

The bleach precursor compositions described herein are useful in a variety of cleaning products. These include laundry detergents, laundry bleaches, hard surface cleaners, toilet bowl cleaners, automatic dishwashing compositions and even denture cleaners.

The following examples will more fully illustrate the embodiments of this invention. All parts, percentages and proportions referred to herein and in the appended claims are by weight unless otherwise illustrated.

EXAMPLE 1

BLEACHING PROCEDURE AGAINST TEA-STAINED CLOTH

Bleaching studies on tea-stained cloths employing the EPPI procedure were carried out by two methods--preconcentration in a plastic test tube and in a laundry powder sachet. Preconcentration of the ingredients in a plastic test tube is a form of encapsulation. Water initially swells the preconcentrated ingredients allowing the perhydrolysis reaction to proceed prior to releasing formed peracid into the wash liquor. Delivery by the aforedescribed EPPI system is herein designated as the "swollen encapsulate" method.

For the "swollen encapsulate" method, a typical experiment was carried out as follows. A 5 ml plastic test tube with a cap (ex. Sarstedt) was employed. The dry ingredients (precursor, sodium percarbonate and sodium carbonate) were added to the test tube, typically 2.5 ml of distilled, deionized water were added, the test tube shaken by hand (usually for one minute) and the contents were added to a one-liter terg-o-tometer pot containing detergent and tea stained cloths. The tube was rinsed twice with distilled, deionized water, the washings added to the pot, and the wash timed for 14 minutes. The cloths in the terg pot were agitated during the one minute incubation time, giving a total wash time of 15 minutes. The pH of the wash liquor was measured at the beginning and end of each experiment. These cloths were then rinsed with tap water, dried in a microwave oven, and the change in reflectance measured on a Hunterlab Colorgard/05 Tristimulus Colorimeter. Change in reflectance is reported herein as R, this being in actual fact the change in the Y tristimulus value, and representing the change in reflectance of the cloth over a range of wavelengths centered in the visible portion of the electromagnetic spectrum. Blanks were run in the same manner but without precursor. Variations in the incubation time, amount of sodium carbonate added, level and type of peroxygen source, agitation, liquid volume in the "swollen encapsulate", etc. were studied.

For the sachet method, the dry ingredients were sealed in several types of sachet systems as described below. These were then dropped into the terg pot containing cloths and detergent solution. The terg-o-tometer procedure was the same as for the "swollen encapsulate" washes, except that the sachet was added instead of the contents of the "swollen encapsulate".

EXAMPLE 2

"SWOLLEN ENCAPSULATE" BLEACHING WITH DCC

Illustrated hereunder are tests performed using what was termed a "swollen encapsulate" in which a 5 ml test tube was used to preconcentrate the precursor and the hydrogen peroxide source. Bleaching tests and peracid titrations were used to determine the efficiency of the EPPI system.

Peracid generation from carbonic acid precursors was determined by ice titration of the peracid in the presence of sodium percarbonate or perborates. Aliquots of the solution were removed at specified time intervals and were added to flasks containing ice and glacial acetic acid. The flasks were deoxygenated before and during the titration by bubbling nitrogen through the solutions. Sodium iodide was added to the flasks, and the aliquots were titrated at −5 to −10° C. with 0.005M sodium thiosulfate to a starch endpoint.

TABLE I

DCC Peracid Titration Results

| Direct Delivery | | EPPI Delivery | |
|---|---|---|---|
| Time (min.) | % Peracid Yield | Time (min.) | % Peracid Yield |
| 0.50 | 8.5 | 0.75 | 55.0 |
| 1.50 | 6.9 | 1.75 | 53.0 |
| 2.50 | 4.8 | 2.75 | 49.0 |
| 3.50 | 3.6 | 3.75 | 43.0 |
| 4.50 | 3.2 | 8.00 | 31.0 |
| 5.50 | 2.4 | 15.00 | 18.0 |
| 7.00 | 1.6 | | |

As the results in Table I indicate, a 5-fold increase in peracid generation was seen with the EPPI system using Concentrated all ® and percarbonate.

Peracid titrations yielded 55% peracid after 45 seconds with remaining at the end of the wash (15 minutes). These results indicate that preconcentration of the precursor with a peroxygen compound significantly improved perhydrolysis of the DCC.

EXAMPLE 3

A number of variables were investigated to obtain the maximum perhydrolysis with the system described in Example 2. Studies were performed in Concentrated all ® with 4.2 ml of water added to the "swollen encapsulate". Upon decreasing the amount of added water, i.e. concentrating the sample even more, an increase in bleaching was noted. The optimum added amount of water to the "swollen encapsulate" was found to be 2.5 ml. This gave the best bleaching results, while still allowing enough water to dissolve precursor and percarbonate thereby obtaining effective mixing and transfer to the wash.

When the base powder was changed to SURF ® and a lower overall pH of the wash liquor, this was found to enhance the whitening of the tea-stained cloth. The pH of the "swollen encapsulate" actually was quite high which increased peracid formation. Once the peracid was generated however and released into the wash liquor at a lower pH, i.e. with the use of SURF ®, the peracid was stabilized and bleaching enhanced. Sodium perborate was considerably less effective than sodium percarbonate in this system; see last entry of Table II.

TABLE II

Variations on "Swollen Encapsulate" Delivery* of DCC as a Bleach Precursor

| Conditions | Percarb:Precursor | DR |
|---|---|---|
| Conc. all ® - (4.2 ml $H_2O$) | 2:1 | 9.9 |
| | 10:1 | 10.0 |
| Conc. all ® - (4.2 ml $H_2O$) + Dequest | 2:1 | 8.8 |
| | 10:1 | 12.0 |
| Conc. all ® - (2.5 ml $H_2O$) | 2:1 | 9.1 |
| | 10:1 | 11.9 |
| Surf ® - (2.5 ml $H_2O$) | 2:1 | 10.2 |
| | 8:1 | 11.2 |
| | 10;1 | 14.6 |
| Surf ® - (2.5 ml $H_2O$) | 8:1 | 12.0 |
| Surf ® - (2.5 ml $H_2O$ + | 2:1 | 0.6 |

TABLE II-continued

| Variations on "Swollen Encapsulate" Delivery* of DCC as a Bleach Precursor | | |
|---|---|---|
| Conditions | Percarb:Precursor | DR |
| $Na_2CO_3$ + Perborate | 5:1 | 0.5 |

*Conditions: Total Dose
2.3 g/l (Conc. all ®)
1.75 g/l (Surf ®)
10 ppm AOX precursor
0 ppm hardness
15 minute wash
one liter 40° C.
1 minute induction time
intensely shaken "swollen encapsulate

EXAMPLE 4

Experiments were conducted to evaluate whether the chloride ion was responsible for any bleaching. Sodium chloride was tested under identical "swollen encapsulate" conditions but was shown not to produce any whitening of the cloth. DCC was prepared as the Bis(p-toluenesulfonate) salt. When this salt was used in the EPPI system, essentially identical bleaching as with the dichloride salt resulted.

TABLE III

| EPPI - Effect of DCC Precursor Anion | |
|---|---|
| System | DC |
| Dichloride | 15.9 |
| Bis(toluenesulfonate) | 16.0 |
| Equivalent NaCl | 0.9 |

Wash Conditions
1.75 g/l total dose (Surf ®)
10 ppm AOX precursor
80 ppm AOX percarbonate
0 ppm hardness
15 minutes
40° C.
1 minute induction time.
2.5 ml "swollen encapsulate" $H_2O$ volume
"swollen encapsulate" vigorously shaken

EXAMPLE 5

A comparison of DCC delivered directly in the wash and through a "swollen encapsulate" was performed under U.S., European and Japanese wash conditions. Results are listed in Table IV. Evident from these results is that high percarbonate to precursor ratios and longer wash periods (i.e. European conditions) are the most favorable.

TABLE IV

| | U.S. Wash* DR (40° C.) | European Wash** DR (40° C.) | Japanese Wash** DR (40° C.) | Japanese Wash** DR (10° C.) |
|---|---|---|---|---|
| No precursor | 0.3 | 2.7 | −0.6 | −1.8 |
| DCC-over-the-side | 0.9 | 3.4 | −0.7 | −2.5 |
| DCC Swollen Encapsulate | 13.9 | 16.5 | 5.2 | −0.7 |

All conditions:
1 minute incubation time
2.5 ml "swollen encapsulate" $H_2O$ volume
"swollen encapsulate" vigorously shaken
*U.S. Wash Conditions:
Total Dose: 1.75 g/l (Surf), 10 ppm AOX DCC, 30 ppm AOX percarbonate, 0 ppm hardness, 15 minute wash.
**European Wash Conditions:
Total Dose: 5.0 g/l (Surf), 10 ppm AOX DCC, 80 ppm AOX percarbonate, 240 ppm hardness, Ca:Mg = 2:1, 30-minute wash.
***Japanese Wash Conditions:
Total Dose: 1.45 g/l (Surf), 4.3 ppm AOX DCC, 18.1 ppm AOX percarbonate, 0 ppm hardness, 15 minute wash.

EXAMPLE 6

A variety of different esters were evaluated to determine bleaching efficacy. All compounds were studied using the "swollen encapsulate" delivery system under approximate U.S. wash conditions, but with a relatively high peroxide to precursor ratio of 8:1 rather than the more typical 2:1 to 3:1. Tea-stain removal as well as peracid titration results are reported in Table V.

TABLE V

| EPPI Delivery of Different Precursors | Over-the-Side Delivery DR | EPPI DR |
|---|---|---|
| Bis [2-(N,N,N-trimethylammonium) ethyl] carbonate dichloride* | 0.9 | 15.9 |
| Acetylcholine | 1.3 | 1.4 |
| 2-(N,N,N-trimethylammonium) ethyl octyl carbonate dichloride | 0.5 | 5.0 |
| 2-(N,N,N-trimethylammonium) ethyl ethyl carbonate dichloride | 0.2 | 0.6 |
| Dimethylcarbonate | −0.1 | −0.3 |
| Diethylcarbonate | 0.0 | −0.1 |
| Polyoxyethylene(100)stearate | −0.5 | −0.3 |
| Polyethyleneglycol(600)dibenzoate | 0.0 | −0.2 |

*DCC
Wash conditions:
Total Dose: 1.75 g/l (Surf ®), 10 ppm AOX precursor, 80 ppm AOX percarbonate, 15 minute wash, 40° C., 0 ppm hardness, 1 minute induction time, 2.5 ml "swollen encapsulate" $H_2O$ volume, "swollen encapsulate" vigorously shaken.

From Table V it is apparent that DCC and the octyl carbonate were very effectively delivered through the "swollen encapsulate". Further, activity was shown with acetylcholine and 2-(N,N,N-trimethylammonium ethyl) ethyl carbonate.

EXAMPLE 7

Herein is reported an experiment demonstrating the deliverability of DCC through a sachet.

The experiment was performed under typical European conditions as listed under Table IV. A 1-ply polyester sachet containing DCC exhibited a wash performance DR of 4.0. This demonstrates the effectiveness of a sachet system for use with the present invention.

The foregoing description and Examples illustrate a selected embodiment of the present invention. In light thereof, various modifications will be suggested to one skilled in the art, all of which are within the spirit and purview of this invention.

What is claimed is:

1. A bleaching composition comprising:
(i) a peroxygen compound capable of generating perhydroxyl anion in an aqueous solution; and
(ii) an organic carbonate bleach precursor having a leaving group whose conjugate asset has a pKa of greater than 13 and a structure which is:

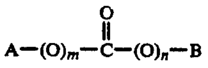

wherein:

A is 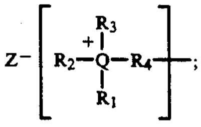;

$R_1$, $R_2$ and $R_3$ are each a radical selected from the group consisting of alkyl, alkenyl, alkynyl, cycloalkyl, cycloalkenyl, alkaryl, aryl, phenyl, hydroxyalkyl, polyoxyalkylene, and $R_4(O)_mC(O)_nR_1$;

$R_4$ is selected from a bridging group consisting of alkylene, cycloalkylene, alkylenephenylene, phenylene, arylene, and polyalkoxylene, and wherein the bridging group can be unsubstituted or substituted with $C_1$–$C_{20}$ atoms selected from the group consisting of alkyl, alkenyl, benzyl, phenyl and aryl radicals;

$Z^-$ is a monovalent or multivalent anion leading to charge neutrality when combined with $Q^+$ in the appropriate ratio and wherein $Z^+$ is sufficiently oxidatively stable not to interfere significantly with bleaching by a peroxy carbonic acid;

Q is nitrogen;

m and n are 1; and

B is A or an alkyl radical; and the peroxygen compound and precursor being present in a relative molar ratio of greater than about 1:1.

2. A composition according to claim 1 wherein said pKa value is at least 13.5 but no higher than 15.

3. A composition according to claim 1 wherein the ratio of peroxygen compound to precursor ranges from about 30:1 to about 2:1.

4. A composition according to claim 1 wherein the ratio of peroxygen compound to precursor is at least 8:1.

5. A composition according to claim 1 wherein the peroxygen compound is sodium percarbonate.

6. A composition according to claim 1 wherein $R_1$, $R_2$ and $R_3$ are each the same or different $C_1$–$C_{20}$ atom radicals selection from the group consisting of alkyl, alkylaryl, benzyl, hydroxyalkyl and mixtures of groups thereof.

7. A composition according to claim 6 wherein $R_1$ is selected from the short-chain $C_1$–$C_4$ alkyl radicals.

8. A composition according to claim 7 wherein $R_2$ and $R_3$ are each a longer chain $C_7$–$C_{20}$ alkyl or alkylaryl radical.

9. A composition according to claim 8 wherein said longer chain radical is selected from the group consisting of benzyl, lauryl and stearyl groups.

10. A composition according to claim 9 wherein $R_4$ is selected from a bridging group consisting of $C_2$–$C_{20}$ alkylene, $C_6$–$C_{12}$ phenylene, $C_5$–$C_{20}$ cycloalkylene, and $C_8$–$C_{20}$ alkylphenylene groups.

11. A composition according to claim 10 wherein the $R_4$ bridging group is a $C_2$–$C_6$ alkylene or $C_6$–$C_{12}$ phenylene group.

12. A composition according to claim 1 wherein the precursor is a bis[2-(N,N,N-trimethylammonium)ethyl] carbonate salt.

13. A composition according to claim 1 wherein the precursor is a 2-(N,N,N-trimethylammonium)ethyl octyl carbonate salt.

14. A composition according to claim 1 wherein the peroxygen compound and the precursor are preconcentrated to form at least 80% by weight of the composition.

15. A composition according to claim 1 wherein the peroxygen compound and the precursor are preconcentrated to form at least 90% by weight of the composition.

16. A composition according to claim 1 wherein the peroxygen compound and the precursor are preconcentrated to form at least 100% by weight of the composition.

17. A composition according to claim 1 wherein the composition is held within a sachet to preconcentrate bleaching components.

18. A composition according to claim 1 wherein the composition is preconcentrated through encapsulation.

* * * * *